United States Patent
Li

(10) Patent No.: US 11,138,412 B2
(45) Date of Patent: Oct. 5, 2021

(54) FACIAL RECOGNITION METHOD AND APPARATUS

(71) Applicant: Tencent Technology (Shenzhen) Company Limited, Shenzhen (CN)

(72) Inventor: Xihua Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/890,484

(22) Filed: Jun. 2, 2020

(65) Prior Publication Data

US 2020/0293761 A1 Sep. 17, 2020

Related U.S. Application Data

(63) Continuation of application No. PCT/CN2019/076398, filed on Feb. 28, 2019.

(30) Foreign Application Priority Data

Mar. 22, 2018 (CN) .......................... 201810239389.3

(51) Int. Cl.
G06K 9/62 (2006.01)
G06K 9/00 (2006.01)

(52) U.S. Cl.
CPC ..... *G06K 9/00288* (2013.01); *G06K 9/00228* (2013.01); *G06K 9/00926* (2013.01); *G06K 9/6215* (2013.01); *G06K 9/6262* (2013.01)

(58) Field of Classification Search
CPC .............................. G06K 9/00221–2009/00328
See application file for complete search history.

(56) References Cited

U.S. PATENT DOCUMENTS

2018/0204111 A1* 7/2018 Zadeh .................. G06K 9/3233

FOREIGN PATENT DOCUMENTS

| CN | 103810466 A | 5/2014 |
| CN | 107403168 A | 11/2017 |
| CN | 108491794 A | 9/2018 |

OTHER PUBLICATIONS

Liton Chandra Paul et al, "Face Recognition Using Principal Component Analysis Method", International Journal of Advanced Research in Computer Engineering & Technology (IJARCET) vol. 1, Issue 9, Nov. 2012, cover page and pp. 135-139. (Year: 2012).*

(Continued)

*Primary Examiner* — Brian Werner
(74) *Attorney, Agent, or Firm* — Morgan, Lewis & Bockius LLP

(57) ABSTRACT

Embodiments of this application disclose a facial recognition method performed at a server. The method includes: obtaining a to-be-recognized facial image and extracting a target eigenvector of the facial image; calculating a distance between each target eigenvector and a mean vector corresponding to each facial identifier to obtain a first distance set, and determining a first recognition result corresponding to the facial image and a corresponding first score according to each first distance set; calculating a distance between each target eigenvector and each eigenvector corresponding to each facial identifier to obtain a second distance set, and determining a second recognition result corresponding to the facial image and a corresponding second score according to each second distance set; and determining a facial recognition result for the facial image and a corresponding score according to a comparison of the first and second recognition results and the first and second scores.

20 Claims, 6 Drawing Sheets

(56) References Cited

OTHER PUBLICATIONS

Marijeta Slavković et al., "Face Recognition Using Eigenface Approach", Serbian Journal of Electrical Engineering vol. 9, No. 1, Feb. 2012, pp. 121-130. (Year: 2012).*
Extended European Search Report, 19770980.1, dated Mar. 2, 2021, 12 pgs.
Jun-ying Gan et al., "A Method for Improved PCA in Face Recognition," International Journal of Information Technology, vol. 11, No. 11, Jan. 1, 2005, XP055776189, 7 pgs.
Daniel Georgescu, "A Real-Time Face Recognition System Using Eigenfaces," Journal of Mobile, Embedded and Distributed Systems, vol. III, No. 4, Jan. 1, 2011, 12 pgs.
Fan Hui et al., "Dynamic Grouping Multi Classes Face Recognition Method," 2002 6th International Conference Signal Processing, Aug. 26, 2002, Northern Jiaotong University Computer Science and Technology College, Beijing, 100044, 4 pgs.
Grace Shin-Yee Tsai et al., "Two-View Face Recognition Using Bayesian Fusion," Proceedings of the 2009 IEEE International Conference on Systems, Man, and Cybernetics, San Antonio, TX, USA, Oct. 2009, 6 pgs.
Tencent Technology, WO, PCT/CN2019/076398, dated Apr. 29, 2019, 5 pgs.
Tencent Technology, IPRP, PCT/CN2019/076398, dated Sep. 22, 2020, 6 pgs.
Tencent Technology, ISR, PCT/CN2019/076398, dated Apr. 29, 2019, 2 pgs.

* cited by examiner

FACIAL RECOGNITION METHOD AND APPARATUS

CROSS REFERENCE TO RELATED APPLICATIONS

This application is a continuation application of PCT Application No. PCT/CN2019/076398, entitled "FACIAL RECOGNITION METHOD AND DEVICE" filed on Feb. 28, 2019, which claims priority to Chinese Patent Application No. 201810239389.3, entitled "FACIAL RECOGNITION METHOD AND APPARATUS" filed with the Chinese National Intellectual Property Administration on Mar. 22, 2018, all of which are incorporated by reference in their entirety.

FIELD OF THE TECHNOLOGY

The present disclosure relates to the field of image processing technologies, and in particular, to a facial recognition method and apparatus.

BACKGROUND OF THE DISCLOSURE

In some cases, it is necessary to perform facial recognition on an obtained facial image, to determine a facial identifier corresponding to the facial image. The facial identifier may be an identifier of a person, or may be an identifier of a corresponding human face image. The facial recognition may be implemented by using a pre-trained classifier. Each category of the classifier is each facial identifier in a database. After obtaining each to-be-recognized facial image, a server may extract an eigenvector of the facial image, and then input the extracted eigenvector into the pre-trained classifier to obtain a facial identifier corresponding to the facial image.

SUMMARY

Embodiments of this application provide a facial recognition method and apparatus, to improve efficiency of facial recognition.

The facial recognition method provided in the embodiments of this application may include:

obtaining a to-be-recognized facial image, and extracting at least one target eigenvector corresponding to the facial image;

calculating a distance between each target eigenvector and a mean vector corresponding to each facial identifier prestored in a database to obtain a first distance set corresponding to each target eigenvector, and determining a facial identifier corresponding to a minimum distance in each first distance set; determining a most frequent facial identifier in facial identifiers corresponding to minimum distances in all the first distance sets as a first recognition result corresponding to the facial image; and determining a first score corresponding to the first recognition result according to a minimum distance corresponding to the first recognition result in each first distance set;

calculating a distance between each target eigenvector and each eigenvector corresponding to each facial identifier prestored in the database to obtain a second distance set corresponding to each target eigenvector, and determining a facial identifier corresponding to a target distance satisfying a preset selection condition in each second distance set; determining a most frequent target facial identifier in facial identifiers corresponding to target distances in all the second distance sets as a second recognition result corresponding to the facial image; and determining a second score corresponding to the second recognition result according to a minimum distance corresponding to the second recognition result in each second distance set; and determining a facial recognition result corresponding to the facial image as one of the first recognition result and the second recognition result and a score corresponding to the facial recognition result by comparing the first recognition result with the second recognition result and comparing the first score corresponding to the first recognition result with the second score corresponding to the second recognition result.

The facial recognition apparatus provided in the embodiments of this application may include:

an obtaining module, configured to obtain a to-be-recognized facial image, and extract at least one target eigenvector corresponding to the facial image;

a first calculation module, configured to calculate a distance between each target eigenvector and a mean vector corresponding to each facial identifier prestored in a database to obtain a first distance set corresponding to each target eigenvector, and determine a facial identifier corresponding to a minimum distance in each first distance set; determine a most frequent facial identifier in facial identifiers corresponding to minimum distances in all the first distance sets as a first recognition result corresponding to the facial image; and determine a first score corresponding to the first recognition result according to a minimum distance corresponding to the first recognition result in each first distance set;

a second calculation module, configured to calculate a distance between each target eigenvector and each eigenvector corresponding to each facial identifier prestored in the database to obtain a second distance set corresponding to each target eigenvector, and determine a facial identifier corresponding to a target distance satisfying a preset selection condition in each second distance set; determine a most frequent target facial identifier in facial identifiers corresponding to target distances in all the second distance sets as a second recognition result corresponding to the facial image; and determine a second score corresponding to the second recognition result according to a minimum distance corresponding to the second recognition result in each second distance set; and a determining module, configured to determine a facial recognition result corresponding to the facial image as one of the first recognition result and the second recognition result and a score corresponding to the facial recognition result by comparing the first recognition result with the second recognition result and comparing the first score corresponding to the first recognition result with the second score corresponding to the second recognition result.

A server provided in the embodiments of this application may include a processor and a memory, the memory storing at least one instruction, at least one program, a code set, or an instruction set, the at least one instruction, the at least one program, the code set, or the instruction set being loaded and executed by the processor to implement the foregoing facial recognition method.

A non-transitory computer-readable storage medium provided in the embodiments of this application may store at least one instruction, at least one program, a code set, or an instruction set, the at least one instruction, the at least one program, the code set, or the instruction set being loaded and executed by a processor to implement the foregoing facial recognition method.

In the embodiments of this application, after obtaining a to-be-recognized facial image, a server may extract at least one target eigenvector corresponding to the facial image, and then calculate a distance between each target eigenvector and a mean vector corresponding to each facial identifier to obtain a first distance set corresponding to each target eigenvector, and determine a first recognition result corresponding to the facial image and a first score corresponding to the first recognition result based on each first distance set. After determining the at least one target eigenvector, the server may further calculate a distance between each target eigenvector and each eigenvector corresponding to each facial identifier to obtain a second distance set corresponding to each target eigenvector, and then determine a second recognition result corresponding to the facial image and a second score corresponding to the second recognition result based on each second distance set. After the first recognition result, the first score corresponding to the first recognition result, the second recognition result, and the second score corresponding to the second recognition result are determined, a facial recognition result corresponding to the facial image and a score corresponding to the facial recognition result may be determined. In this way, the facial recognition result corresponding to the facial image may be determined by merging the first recognition result and the second recognition result without training a classifier in advance. Therefore, retraining of the classifier may be avoided when a new facial identifier is added, so that efficiency of facial recognition may be improved.

BRIEF DESCRIPTION OF THE DRAWINGS

To describe the technical solutions in the embodiments of this application more clearly, the accompanying drawings required for describing the embodiments are briefly described hereinafter. Apparently, the accompanying drawings in the following description show merely some embodiments of this application, and a person of ordinary skill in the art may obtain other accompanying drawings from these accompanying drawings without creative efforts.

FIG. 1(*b*) is a flowchart of a facial recognition method according to an embodiment of this application.

FIG. 2(*b*) is a schematic framework diagram according to an embodiment of this application.

DESCRIPTION OF EMBODIMENTS

To make the objectives, technical solutions, and advantages of this application clearer, the following further describes the implementations of this application in detail with reference to the accompanying drawings.

Figure 1A:
FIG. 1(*a*) is a schematic diagram of an implementation environment according to an embodiment of this application.

Embodiments of this application provide a facial recognition method, an execution body of the method being one or more computing devices, for example, a terminal or a server. Alternatively, the method may be jointly implemented by the terminal and the server, as shown in FIG. 1(*a*). The terminal may be any terminal with a facial recognition function, for example, may be a terminal such as a personal computer. The server may be a server with a facial recognition function, for example, may be a backend server with a facial recognition function. In a case that the method is jointly implemented by the terminal and the server, after obtaining a to-be-recognized facial image, the terminal may send the facial image to the server. Then, the server may determine a facial recognition result corresponding to the to-be-recognized facial image. The following provides a detailed description by using an example in which the execution body is a server. Another case is similar thereto, and is not further described.

The server may include components such as a processor and a memory. The processor may be a CPU or the like. The processor may perform processing such as determining a first recognition result corresponding to a facial image according to a mean search algorithm, determining a second recognition result corresponding to the facial image according to a neighbor search algorithm, and determining a facial recognition result corresponding to the facial image according to the first recognition result and the second recognition result. The memory may be a random access memory (RAM), a flash, or the like, which may be configured to store received data, data required during processing, data generated during processing, and the like, for example, the first recognition result and the second recognition result.

In some scenarios, the server may perform facial recognition on a to-be-recognized facial image. For example, in an attendance checking scenario based on a human face, the server may obtain a to-be-recognized human face image by using an image photographing apparatus, and perform facial recognition on the image. For another example, in a scenario of determining, through facial recognition, whether an obtained facial image is of a person who is looked for, image photographing apparatuses may be deployed at a plurality of positions. After obtaining a facial image sent by each image photographing apparatus, the server may perform facial recognition on the image, to determine whether a person in the facial image is the person who is looked for.

In the related art of facial recognition, after obtaining a sample facial image corresponding to each facial identifier in a database, the server may extract an eigenvector of each sample facial image, and train a multiclass classifier based on each eigenvector and a facial identifier corresponding to the each eigenvector. Each category of the classifiers is each facial identifier in the database. In this case, whenever a new facial identifier needs to be added to the database, the classifier needs to be retrained to obtain a classifier including a category of the added facial identifier, resulting in poor expansibility and relatively high costs of the classifier.

In this solution, after obtaining a to-be-recognized facial image, the server may determine a first recognition result and a second recognition result corresponding to the facial image based on the mean search algorithm and the neighbor search algorithm respectively, and obtain a facial recognition result corresponding to the facial image based on the first recognition result and the second recognition result, that is, obtain a facial identifier corresponding to the facial image. In this way, the server may determine the facial identifier corresponding to the facial image by merging the mean search algorithm and the neighbor search algorithm. In this solution, there is no need to train a classifier, and retraining of the classifier may be avoided when a new facial identifier is added. In this solution, efficiency of facial recognition may be further improved. In addition, in this solution, by merging the facial recognition result and the score determined according to the mean search algorithm and the facial recognition result and the score determined according to the neighbor search algorithm, accuracy of facial recognition may be enhanced, and a correct recognition may be assigned a high score, so that a recall rate of facial recognition can be improved. In addition, the method provided in the embodiments of this application has a relatively wide range of application. For example, the method may be applied to single image per-person (SIPP, in which each person has only one training sample facial image), and may also be applied to a hybrid scenario and other scenarios requiring facial recognition.

Figure 1B:
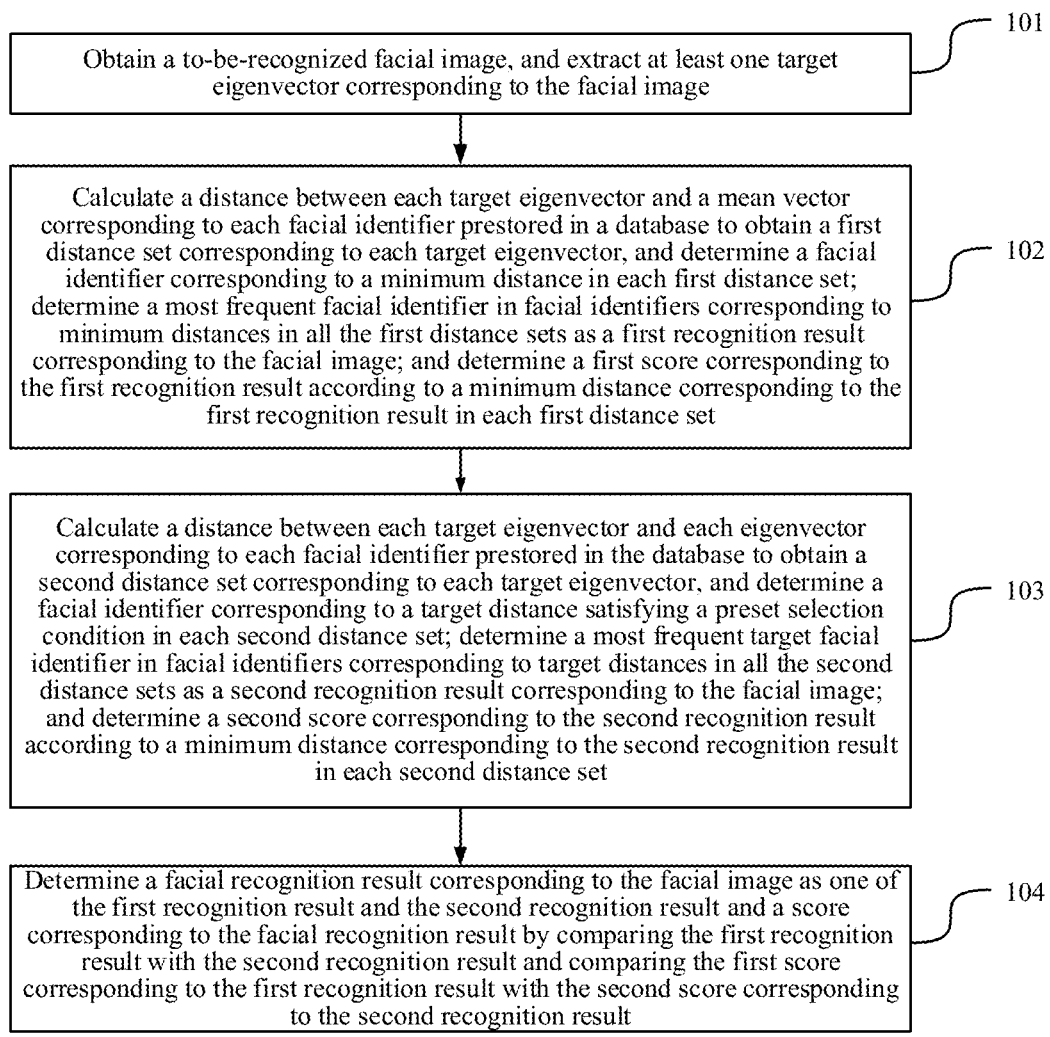

As shown in FIG. 1(b), a processing process of some embodiments may include the following steps.

Step 101. Obtain a to-be-recognized facial image, and extract at least one target eigenvector corresponding to the facial image.

The facial image may be an image including a face, for example, may be a human face image including a human face.

In an implementation, in some scenarios, the server may perform facial recognition on a to-be-recognized facial image. For example, in an attendance checking scenario based on a human face, the server may obtain a to-be-recognized human face image by using an image photographing apparatus, and then perform facial recognition on the image. For another example, in a scenario of determining, through facial recognition, whether an obtained facial image is of a person who is looked for, image photographing apparatuses may be deployed at a plurality of positions. After obtaining a facial image sent by each image photographing apparatus, the server may perform facial recognition on the image, to determine whether a person in the facial image is the person who is looked for.

The server may obtain the to-be-recognized facial image, and then extract at least one eigenvector (which may be referred to as a target eigenvector) q corresponding to the facial image through a depth network. q may be an eigenvector corresponding to an original facial image, an eigenvector corresponding to each of a plurality of facial images obtained after image augmentation, or a mean vector of eigenvectors corresponding to the plurality of facial images obtained after image augmentation. The server may obtain a to-be-recognized facial image based on an application scenario. For example, in the attendance checking scenario based on a human face, the server may obtain a facial image photographed by an image photographing apparatus deployed by an enterprise; in the scenario of determining, through facial recognition, whether an obtained facial image is of a person who is looked for, the server may obtain a facial image photographed by an image photographing apparatus deployed by a department like a traffic management department.

Step 102. Calculate a distance between each target eigenvector and a mean vector corresponding to each facial identifier prestored in a database to obtain a first distance set corresponding to each target eigenvector, and determine a facial identifier corresponding to a minimum distance in each first distance set; determine a most frequent facial identifier in facial identifiers corresponding to minimum distances in all the first distance sets as a first recognition result corresponding to the facial image; and determine a first score corresponding to the first recognition result according to a minimum distance corresponding to the first recognition result in each first distance set.

The first score may be used for representing a possibility or reliability that a facial identifier corresponding to the facial image is the first recognition result. For example, the higher the score, the higher the possibility that the facial identifier represents the person in the to-be-recognized facial image and vice versa.

In an implementation, the server may prestore a sample facial image corresponding to each facial identifier. Quantities of sample facial images corresponding to all the facial identifiers may be the same, or may be different. The sample facial image corresponding to each facial identifier may include an original facial image obtained directly (the original facial image may be a facial image obtained by photographing), or may be a sample facial image obtained through image augmentation according to the original facial image. For each facial identifier, the server may extract an eigenvector of each sample facial image corresponding to the facial identifier through the depth network to obtain at least one eigenvector corresponding to the facial identifier, and then calculate a mean vector of the at least one eigenvector corresponding to the facial identifier. Assuming that a quantity of facial identifiers in the database is k (k is a positive integer), and each facial identifier corresponds to mk sample facial images (m is a positive integer), the at least one eigenvector and the mean vector corresponding to each facial identifier may be as follows:

$$p11, p12, \ldots p1m1, \text{mean vector: } mp1$$
$$p21, p22, \ldots p2m2, \text{mean vector: } mp2$$
$$\ldots, \ldots, \ldots$$
$$pk1, pk2, \ldots pkmk, \text{mean vector: } mpk$$

After determining the at least one target eigenvector, in a case that the target eigenvector q is the eigenvector corresponding to the original facial image, or is the mean vector corresponding to the plurality of facial images obtained after image augmentation, the server may calculate a distance (the distance may be a Euclidean distance, a cosine distance, or other types of vector distances) between the target eigenvector q and a mean vector $mpi$ ($i=1 \ldots k$) corresponding to each facial identifier, to obtain a first distance set. After obtaining the first distance set, the server may determine a facial identifier corresponding to a minimum distance as a first recognition result id1 corresponding to the to-be-recognized facial image.

In some embodiments, the server may preset a distance threshold. The distance threshold may be a distance threshold of the cosine distance, may be a distance threshold of the Euclidean distance. After obtaining the first distance set, the server may compare the minimum distance with the preset distance threshold. If the minimum distance is less than the preset distance threshold, the facial identifier corresponding to the minimum distance is determined as the first recognition result id1 corresponding to the to-be-recognized facial image; otherwise, the recognition fails.

In some embodiments, in a case that a plurality of facial images of the to-be-recognized facial image are obtained through image augmentation (the plurality of facial images include the to-be-recognized facial image and at least one facial image obtained after the image augmentation), that is, in a case that the facial image corresponds to a plurality of target eigenvectors, for each facial image, the server may calculate a distance between a target eigenvector of the facial image and the mean vector mpi corresponding to each facial identifier to obtain a first distance set corresponding to the facial image, and then determine a facial identifier corresponding to a minimum distance as a facial identifier corresponding to the facial image. After obtaining facial identifiers corresponding to all the facial images, the server may determine a most frequent facial identifier as a first recognition result corresponding to the to-be-recognized facial image. That is, after obtaining the at least one target eigenvector corresponding to the facial image, the server may determine a first recognition result corresponding to the facial image and a first score corresponding to the first recognition result through the mean search algorithm. The mean search algorithm may be an algorithm of determining a recognition result by comparing with a mean vector.

After obtaining the to-be-recognized facial image, the server may further determine a first score s1 corresponding to the first recognition result in addition to determining the first recognition result corresponding to the facial image. For example, the server may obtain a distance corresponding to the first recognition result in each first distance set, and determine a minimum distance in all distances. The first score is determined according to the minimum distance in all the distances corresponding to the first recognition result. For example, a reciprocal of the minimum distance in all the distances corresponding to the first recognition result may be determined as the first score.

Step 103. Calculate a distance between each target eigenvector and each eigenvector corresponding to each facial identifier prestored in the database to obtain a second distance set corresponding to each target eigenvector, and determine a facial identifier corresponding to a target distance satisfying a preset selection condition in each second distance set; determine a most frequent target facial identifier in facial identifiers corresponding to target distances in all the second distance sets as a second recognition result corresponding to the facial image; and determine a second score corresponding to the second recognition result according to a minimum distance corresponding to the second recognition result in each second distance set.

The second score may be used for representing a possibility or reliability that the facial identifier corresponding to the facial image is the second recognition result. For example, the higher the score, the higher the possibility that the facial identifier represents the person in the to-be-recognized facial image and vice versa.

In an implementation, after determining the at least one target eigenvector, in the case that the target eigenvector q is the eigenvector corresponding to the original facial image, or is the mean vector corresponding to the plurality of facial images obtained after image augmentation, the server may calculate a distance between the target eigenvector q and an eigenvector of each sample facial image to obtain a second distance set, and then select a preset quantity of minimum distances or select a target distance less than the preset distance threshold in the second distance set. After selecting the target distance, the server may determine a facial identifier corresponding to each target distance, and then count quantities of occurrence times corresponding to different facial identifiers, and determine a most frequent target facial identifier as a second recognition result corresponding to the to-be-recognized facial image.

In some embodiments, in the case that a plurality of facial images of the to-be-recognized facial image are obtained through image augmentation, that is, in the case that the facial image corresponds to a plurality of target eigenvectors, for each facial image, the server may calculate a distance between a target eigenvector of the facial image and each eigenvector corresponding to each facial identifier, to obtain a second distance set corresponding to the facial image. Then, the server selects a preset quantity of minimum distances or a target distance less than the preset distance threshold in each second distance set. After selecting the target distance corresponding to each second distance set, the server may determine a facial identifier corresponding to each target distance, and then count quantities of occurrence times corresponding to different facial identifiers, and determine a most frequent target facial identifier. After the target facial identifier corresponding to each target eigenvector is obtained, a corresponding most frequent target facial identifier in target facial identifiers may be determined as a second recognition result corresponding to the facial image. That is, after obtaining the at least one target eigenvector corresponding to the facial image, the server may determine a second recognition result corresponding to the facial image and a second score corresponding to the second recognition result through the neighbor search algorithm. The neighbor search algorithm may be an algorithm of determining a recognition result through comparison with an eigenvector corresponding to each sample facial image, which may be a local sensitive hashing (LSH) algorithm.

After the server obtains the to-be-recognized facial image, the server may further determine a second score s2 corresponding to the second recognition result in addition to determining the second recognition result corresponding to the facial image. For example, the server may obtain each distance corresponding to the second recognition result in each second distance set, and then determine a minimum distance corresponding to the second recognition result in distances, and determine the second score according to the minimum distance corresponding to the second recognition result in the distances. For example, a reciprocal of the minimum distance corresponding to the second recognition result in the distances may be determined as the second score.

Step 104. Determine a facial recognition result corresponding to the facial image as one of the first recognition result and the second recognition result and a score corresponding to the facial recognition result by comparing the first recognition result with the second recognition result and comparing the first score corresponding to the first recognition result with the second score corresponding to the second recognition result.

Figure 2A:
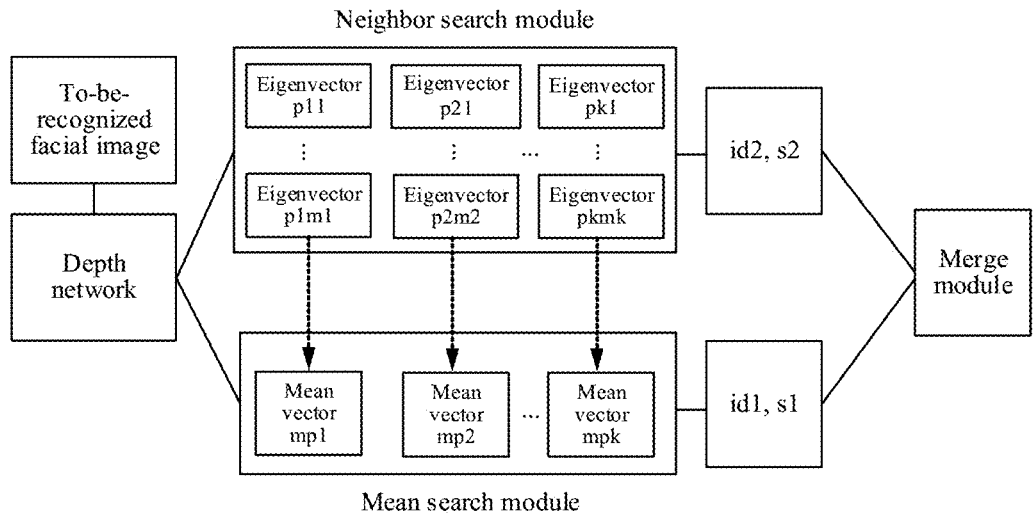
FIG. 2(*a*) is a schematic framework diagram according to an embodiment of this application.

In an implementation, after determining the first recognition result, the first score corresponding to the first recognition result, the second recognition result, and the second score corresponding to the second recognition result, the server may determine a facial recognition result f_id corresponding to the to-be-recognized facial image and a score f_score corresponding to the facial recognition result according to the first recognition result, the first score corresponding to the first recognition result, the second recognition result, and the second score corresponding to the second recognition result. For example, based on some conditions, one of the first recognition result and the second recognition result is determined as the facial recognition result corresponding to the facial image. A processing framework of this solution is shown in FIG. 2(*a*).

Figure 2B:
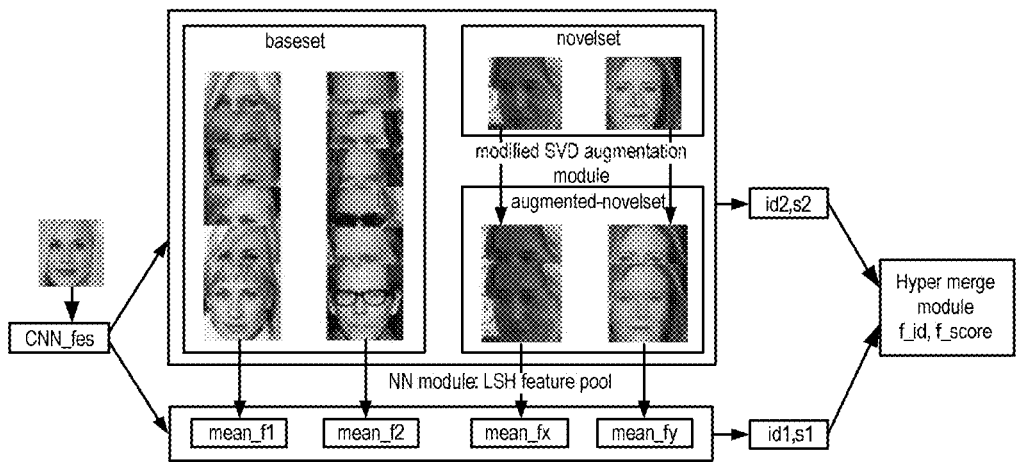

In some embodiments, an entire procedure of this solution is shown in FIG. 2(b). CNN_fes is a depth network used for extracting an eigenvector, baseset may be a set of facial identifiers corresponding to a relatively large quantity of sample facial images, novelset may be a set of facial identifiers corresponding to a relatively small quantity of sample facial images, augmented-novelset may be a novelset obtained after image augmentation, Modified SVD augmentation module may be an improved SVD augmentation module, NN module: LSH feature pool may be a neighbor search module based on LSH, Mean search feature pool may be a mean search module, and Hyper merge module may be a merge module corresponding to step 104.

In different embodiments, based on different manners of determining the facial recognition result, the processing process of step 104 may be different. The following describes implementations of some cases.

Case 1: Choose one of the first recognition result and the second recognition result as the facial recognition result corresponding to the facial image and choose a higher score of the first score and the second score as the score corresponding to the facial recognition result in a case that the first recognition result is the same as the second recognition result.

In an implementation, after determining the first recognition result and the second recognition result, the server may determine whether the first recognition result is the same as the second recognition result. If the first recognition result is the same as the second recognition result, the server may determine the first recognition result or the second recognition result as the facial recognition result corresponding to the facial image. Correspondingly, the server may determine a higher score in the first score and the second score, and then determine the score as the score corresponding to the facial recognition result.

If the first recognition result is the same as the second recognition result, it indicates that the recognition is highly likely to be correct, that is, a facial identifier actually corresponding to the facial image is highly likely to be the first recognition result or the second recognition result, and a confidence level of determining the first recognition result or the second recognition result as the facial recognition result corresponding to the facial image is relatively high. Therefore, such processing can improve accuracy of facial recognition, and improve the score of the recognition result, that is, a correct recognition may be assigned a relatively high score, so that a recall rate of facial recognition can be improved.

Case 2: Choose the second recognition result as the facial recognition result corresponding to the facial image and choose the second score as the score corresponding to the facial recognition result in a case that the first recognition result is different from the second recognition result and the second score is greater than the first score by a first preset threshold.

In an implementation, when the first recognition result is different from the second recognition result, the server may obtain the first score corresponding to the first recognition result and the second score corresponding to the second recognition result through the foregoing manners. Through comparison between the first score and the second score, one of the first recognition result and the second recognition result may be determined as the facial recognition result corresponding to the facial image.

For example, if the first recognition result is different from the second recognition result, the server may further compare the first score with the second score. If the difference between the second score and the first score is greater than the first preset threshold, the server may determine the second recognition result as the facial recognition result of the facial image. Correspondingly, the server may determine the second score as the score corresponding to the facial recognition result.

If the second score is greater than the first score for the first preset threshold, it indicates that the second recognition result determined through the neighbor search algorithm is more reliable than that of the first recognition result determined through the mean search algorithm. Therefore, such processing can improve accuracy of facial recognition, and improve the score of the recognition result, that is, a correct recognition may be assigned a relatively high score, so that a recall rate of facial recognition can be improved.

Case 3: Choose the first recognition result as the facial recognition result corresponding to the facial image and choose the first score as the score corresponding to the facial recognition result in a case that the first recognition result is different from the second recognition result and the first score is greater than the second score by a second preset threshold.

In an implementation, the server may prestore the second preset threshold. The first preset threshold and the second preset threshold may be the same, or may be different. If the first recognition result is different from the second recognition result, and the difference between the first score and the second score is greater than the second preset threshold, the server may determine the first recognition result as the facial recognition result corresponding to the facial image. Correspondingly, the first score is determined as the score corresponding to the facial recognition result.

If the second score is less than the first score for the second preset threshold, it indicates that the second recognition result determined through the neighbor search algorithm is less reliable than that of the first recognition result determined through the mean search algorithm. Therefore, such processing can improve accuracy of facial recognition, and improve the score of the recognition result, that is, a correct recognition may be assigned a relatively high score, so that a recall rate of facial recognition can be improved.

If the second score is less than the first score by the second preset threshold, it indicates that, the second recognition result determined through the neighbor search algorithm is less reliable than that of the first recognition result determined through the mean search algorithm. Therefore, such processing can improve accuracy of facial recognition, and improve the score of the recognition result, that is, a correct recognition may be assigned a relatively high score, so that a recall rate of facial recognition can be improved.

Case 4: Choose the first recognition result as the facial recognition result corresponding to the facial image and choose a lower score of the first score and the second score as the score corresponding to the facial recognition result in a case that the first recognition result is different from the second recognition result, an absolute difference between the second score and the first score is less than a less of a first preset threshold and a second preset threshold.

In an implementation, when the first recognition result is different from the second recognition result, the difference between the second score and the first score is less than the first preset threshold, and the difference between the first score and the second score is less than the second preset threshold, the server may determine the first recognition result as the facial recognition result corresponding to the facial image. Correspondingly, the server may determine the lower score in the first score and the second score as the score corresponding to the facial image.

Usually, accuracy of the recognition result determined through the mean search algorithm is higher than accuracy of the recognition result determined through the neighbor search algorithm. If the first recognition result is different from the second recognition result, it indicates that the recognition is less likely to be correct. Therefore, such processing can correctly reflect a status of the facial recognition.

Case 5: Input the first recognition result, the first score corresponding to the first recognition result, the second recognition result, and the second score corresponding to the second recognition result into a pre-trained facial recognition model, to obtain the facial recognition result corresponding to the facial image and the score corresponding to the facial recognition result.

In an implementation, the server may prestore a facial recognition model trained according to a sample facial image. The facial recognition result determined through the mean search algorithm and the score corresponding to the facial recognition result and the facial recognition result determined through the neighbor search algorithm and the score corresponding to the facial recognition result may be inputted into the facial recognition model. The facial recognition model may be a decision model, a neural network model, or the like. After determining the first recognition result, the first score corresponding to the first recognition result, the second recognition result, and the second score corresponding to the second recognition result, the server may input the first recognition result, the first score, the second recognition result, and the second score into the pre-trained facial recognition model to obtain an output of the facial recognition model, that is, to obtain the facial recognition result corresponding to the facial image and the score corresponding to the facial recognition result.

The server may support processing of any combination of the case 1 to case 5.

In embodiments, a training process of the facial recognition model may be as follows: A distance between an eigenvector corresponding to each training facial image and the mean vector corresponding to each facial identifier prestored in the database is calculated to obtain a first distance set. A facial identifier corresponding to a minimum distance in the first distance set is determined as a first recognition result corresponding to each training facial image. A first score corresponding to the first recognition result is determined according to a minimum distance corresponding to the first recognition result in the first distance set. A distance between the eigenvector corresponding to each training facial image and each eigenvector corresponding to each facial identifier prestored in the database is calculated to obtain a second distance set. A facial identifier corresponding to a target distance that satisfies a preset selection condition in the second distance set is determined. A most frequent target facial identifier in facial identifiers corresponding to all target distances is determined as a second recognition result corresponding to each training facial image. A second score corresponding to the second recognition result is determined according to a minimum distance corresponding to the second recognition result in the second distance set. The first recognition result, the first score, the second recognition result, and the second score corresponding to each training facial image are inputted into a facial recognition model to obtain a recognition result and a score corresponding to each training facial image. A model parameter of the facial recognition model is adjusted according to the obtained facial recognition result and score corresponding to each training facial image and a preset facial recognition result and score corresponding to each training facial image to obtain a trained facial recognition model.

In an implementation, the server may prestore a large quantity of training facial images corresponding to facial identifiers. If a quantity of original facial images obtained directly corresponding to a facial identifier is relatively small, the server may perform image augmentation on the original facial images obtained directly to obtain a plurality of sample facial images (in this case, training facial images corresponding to the facial identifier include the original facial images and the training facial images obtained through the image augmentation). For each training facial image, the server may extract an eigenvector of the training facial image through the depth network, and then calculate a distance between the eigenvector corresponding to each training facial image and the mean vector corresponding to each facial identifier prestored in the database to obtain a first distance set. A facial identifier corresponding to a minimum distance in the first distance set is determined as a first recognition result corresponding to each training facial image. Correspondingly, the server may obtain a minimum distance corresponding to the first recognition result in the first distance set. Further, a first score corresponding to the first recognition result may be determined based on the minimum distance.

In addition to determining the first recognition result and the first score, the server may further determine a second recognition result and a second score corresponding to the second recognition result. For example, a distance between the eigenvector corresponding to each training facial image and each eigenvector corresponding to each facial identifier prestored in the database may be calculated to obtain a second distance set. A facial identifier corresponding to a target distance that satisfies a preset selection condition in the second distance set is determined. Then, a most frequent target facial identifier in facial identifiers corresponding to all target distances is determined as a second recognition result corresponding to each training facial image. Correspondingly, the server may obtain a minimum distance corresponding to the second recognition result in the second distance set. Then, a second score corresponding to the second recognition result may be determined based on the minimum distance.

After determining the first recognition result, the first score, the second recognition result, and the second score corresponding to each training facial image, the server may input the first recognition result, the first score, the second recognition result, and the second score corresponding to the training facial image into the facial recognition model to obtain a facial recognition result and a score corresponding to each training facial image. The facial recognition result and the score obtained through the facial recognition model include the model parameter in the facial recognition model.

After obtaining the facial recognition result and the score corresponding to each training facial image, the server may train the facial recognition model (the facial recognition model may be trained by using a gradient descent method), that is, adjust the model parameter of the facial recognition model, based on a training rule that the obtained facial recognition result is close to a preset facial recognition result corresponding to the training facial image and the obtained score is close to a preset score corresponding to the training facial image (for example, a difference between the two may be determined as an objective function, and then the facial recognition model is trained by calculating a minimum value of the objective function), to obtain the trained facial recognition model. The preset facial recognition result corresponding to the training facial image may be a facial recognition result actually corresponding to the training facial image. For each training facial image, if a corresponding first recognition result and/or second recognition result and an actually corresponding facial identifier are the same, a corresponding score may be set to be relatively high, and if the corresponding first recognition result and/or second recognition result and the actually corresponding facial identifier are different, the corresponding score may be set to be relatively low.

In this solution, by merging the facial recognition result determined according to the mean search algorithm and the facial recognition result determined according to the neighbor search algorithm, accuracy of facial recognition may be improved; and by merging the scores determined according to the two algorithms, a correct recognition may be assigned a relatively high score, so that a recall rate of facial recognition can be improved.

In some embodiments, this solution may be widely applied to a plurality of scenarios, which may be applied to an SIPP scenario, and may also be applied to a hybrid scenario (the hybrid scenario refers to a scenario in which some facial identifiers each correspond to one sample facial image, and some facial identifiers each correspond to a plurality of sample facial images in the database).

Figure 3:
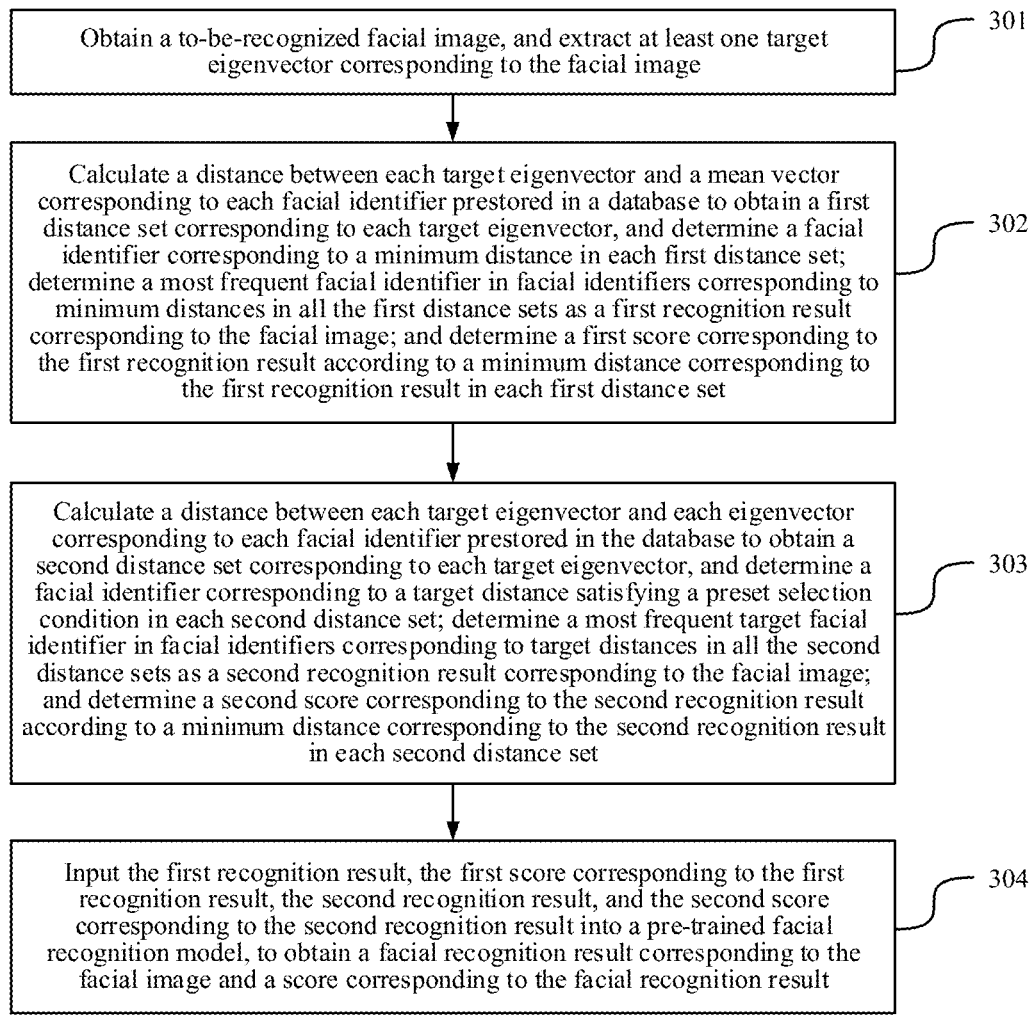
FIG. 3 is a flowchart of a facial recognition method according to an embodiment of this application.

In some embodiments, for a case of determining a facial recognition result corresponding to a facial image by using a facial recognition model, a procedure shown in FIG. 3 is further provided in the embodiments of this application.

Step 301. Obtain a to-be-recognized facial image, and extract at least one target eigenvector corresponding to the facial image.

Step 302. Calculate a distance between each target eigenvector and a mean vector corresponding to each facial identifier prestored in a database to obtain a first distance set corresponding to each target eigenvector, and determine a facial identifier corresponding to a minimum distance in each first distance set; determine a most frequent facial identifier in facial identifiers corresponding to minimum distances in all the first distance sets as a first recognition result corresponding to the facial image; and determine a first score corresponding to the first recognition result according to a minimum distance corresponding to the first recognition result in each first distance set.

Step 303. Calculate a distance between each target eigenvector and each eigenvector corresponding to each facial identifier prestored in the database to obtain a second distance set corresponding to each target eigenvector, and determine a facial identifier corresponding to a target distance satisfying a preset selection condition in each second distance set; determine a most frequent target facial identifier in facial identifiers corresponding to target distances in all the second distance sets as a second recognition result corresponding to the facial image; and determine a second score corresponding to the second recognition result according to a minimum distance corresponding to the second recognition result in each second distance set.

Step 304. Input the first recognition result, the first score corresponding to the first recognition result, the second recognition result, and the second score corresponding to the second recognition result into a pre-trained facial recognition model, to obtain a facial recognition result corresponding to the facial image and a score corresponding to the facial recognition result.

In an implementation, the server may prestore a facial recognition model trained according to a sample facial image. A facial recognition result determined through the mean search algorithm and a score corresponding to the facial recognition result and a facial recognition result determined through the neighbor search algorithm and a score corresponding to the facial recognition result may be inputted into the facial recognition model. The facial recognition model may be a decision model, a neural network model, or the like. After determining the first recognition result, the first score corresponding to the first recognition result, the second recognition result, and the second score corresponding to the second recognition result, the server may input the first recognition result, the first score, the second recognition result, and the second score into the pre-trained facial recognition model to obtain an output of the facial recognition model, that is, to obtain the facial recognition result corresponding to the facial image and the score corresponding to the facial recognition result.

In the embodiments of this application, after obtaining a to-be-recognized facial image, a server may extract at least one target eigenvector corresponding to the facial image, and then calculate a distance between each target eigenvector and a mean vector corresponding to each facial identifier to obtain a first distance set corresponding to each target eigenvector, and determine a first recognition result corresponding to the facial image and a first score corresponding to the first recognition result based on each first distance set. After determining the at least one target eigenvector, the server may further calculate a distance between each target eigenvector and each eigenvector corresponding to each facial identifier to obtain a second distance set corresponding to each target eigenvector, and then determine a second recognition result corresponding to the facial image and a second score corresponding to the second recognition result based on each second distance set. After the first recognition result, the first score corresponding to the first recognition result, the second recognition result, and the second score corresponding to the second recognition result are determined, a facial recognition result corresponding to the facial image and a score corresponding to the facial recognition result may be determined. In this way, the facial recognition result corresponding to the facial image may be determined by merging the first recognition result and the second recognition result without training a classifier in advance. Therefore, retraining of the classifier may be avoided when a new facial identifier is added, so that efficiency of facial recognition may be improved.

Figure 4:
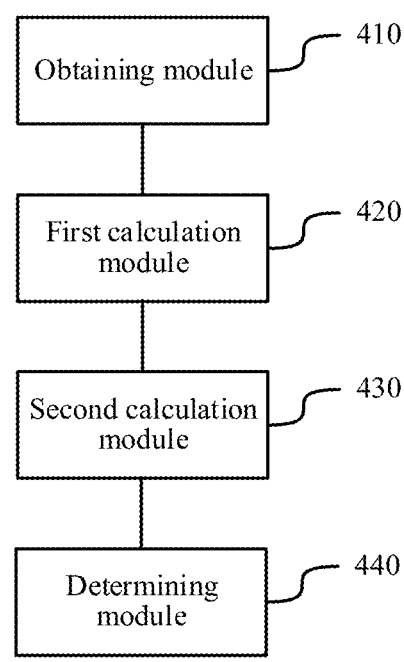
FIG. 4 is a schematic structural diagram of a facial recognition apparatus according to an embodiment of this application.

Based on the same technical idea, the embodiments of this application further provide a facial recognition apparatus. As shown in FIG. 4, the apparatus may be the foregoing server, including:

an obtaining module 410, configured to obtain a to-be-recognized facial image, and extract at least one target eigenvector corresponding to the facial image;

a first calculation module 420, configured to calculate a distance between each target eigenvector and a mean vector corresponding to each facial identifier prestored in a database to obtain a first distance set corresponding to each target eigenvector, and determine a facial identifier corresponding to a minimum distance in each first distance set; determine a most frequent facial identifier in facial identifiers corresponding to minimum distances in all the first distance sets as a first recognition result corresponding to the facial image; and determine a first score corresponding to the first recognition result according to a minimum distance corresponding to the first recognition result in each first distance set;

a second calculation module 430, configured to calculate a distance between each target eigenvector and each eigenvector corresponding to each facial identifier prestored in the database to obtain a second distance set corresponding to each target eigenvector, and determine a facial identifier corresponding to a target distance satisfying a preset selection condition in each second distance set; determine a most frequent target facial identifier in facial identifiers corresponding to target distances in all the second distance sets as a second recognition result corresponding to the facial image; and determine a second score corresponding to the second recognition result according to a minimum distance corresponding to the second recognition result in each second distance set; and a determining module 440, configured to determine a facial recognition result corresponding to the facial image and a score corresponding to the facial recognition result according to the first recognition result, the first score corresponding to the first recognition result, the second recognition result, and the second score corresponding to the second recognition result.

In different embodiments, the determining module 440 is further configured to:

choose one of the first recognition result and the second recognition result as the facial recognition result corresponding to the facial image and choose a higher score of the first score and the second score as the score corresponding to the facial recognition result in a case that the first recognition result is the same as the second recognition result.

In different embodiments, the determining module 440 is further configured to:

choose the second recognition result as the facial recognition result corresponding to the facial image and choose the second score as the score corresponding to the facial recognition result in a case that the first recognition result is different from the second recognition result and the second score is greater than the first score by a first preset threshold.

In different embodiments, the determining module 440 is further configured to:

choose the first recognition result as the facial recognition result corresponding to the facial image and choose the first score as the score corresponding to the facial recognition result in a case that the first recognition result is different from the second recognition result and the first score is greater than the second score by a second preset threshold.

In different embodiments, the determining module 440 is further configured to:

choose the first recognition result as the facial recognition result corresponding to the facial image and choose a lower score of the first score and the second score as the score corresponding to the facial recognition result in a case that the first recognition result is different from the second recognition result, an absolute difference between the second score and the first score is less than a less of a first preset threshold and a second preset threshold.

In different embodiments, the determining module 440 is further configured to:

input the first recognition result, the first score corresponding to the first recognition result, the second recognition result, and the second score corresponding to the second recognition result into a pre-trained facial recognition model, to obtain the facial recognition result corresponding to the facial image and the score corresponding to the facial recognition result.

Figure 5:
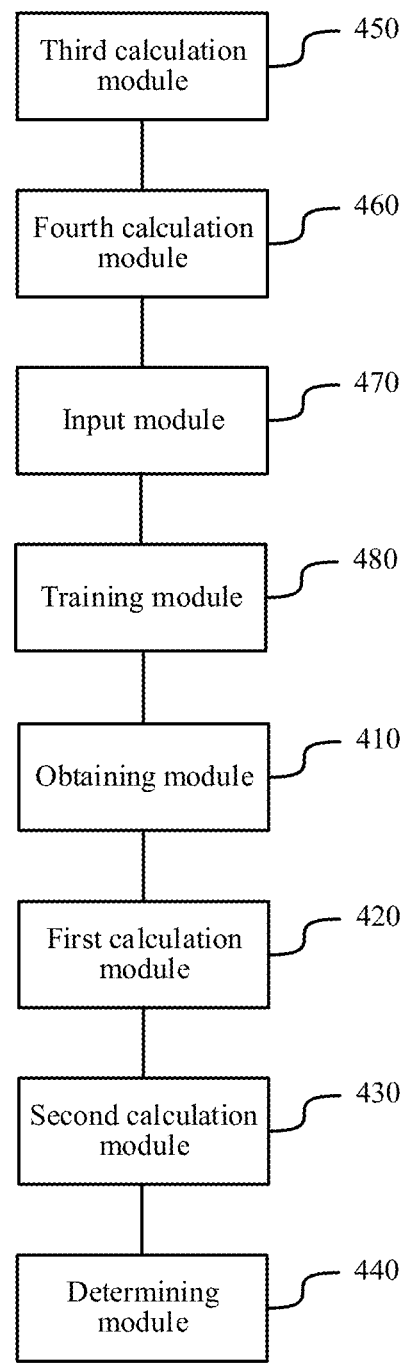
FIG. 5 is a schematic structural diagram of a facial recognition apparatus according to an embodiment of this application.

In different embodiments, as shown in FIG. 5, the apparatus further includes:

a third calculation module 450, configured to calculate a distance between an eigenvector corresponding to each training facial image and the mean vector corresponding to each facial identifier prestored in the database to obtain a first distance set, determine a facial identifier corresponding to a minimum distance in the first distance set as a first recognition result corresponding to each training facial image, and determine a first score corresponding to the first recognition result according to a minimum distance corresponding to the first recognition result in the first distance set;

a fourth calculation module 460, configured to calculate a distance between the eigenvector corresponding to each training facial image and each eigenvector corresponding to each facial identifier prestored in the database to obtain a second distance set, and determine a facial identifier corresponding to a target distance satisfying the preset selection condition in the second distance set; and determine a most frequent target facial identifier in facial identifiers corresponding to all target distances as a second recognition result corresponding to each training facial image, and determine a second score corresponding to the second recognition result according to a minimum distance corresponding to the second recognition result in the second distance set;

an input module 470, configured to input the first recognition result, the first score, the second recognition result, and the second score corresponding to each training facial image into a facial recognition model to obtain a facial recognition result and a score corresponding to each training facial image; and a training module 480, configured to adjust a model parameter of the facial recognition model according to the obtained facial recognition result and score corresponding to each training facial image and a preset facial recognition result and score corresponding to each training facial image to obtain the trained facial recognition model.

In the embodiments of this application, after obtaining a to-be-recognized facial image, a server may extract at least one target eigenvector corresponding to the facial image, and then calculate a distance between each target eigenvector and a mean vector corresponding to each facial identifier to obtain a first distance set corresponding to each target eigenvector, and determine a first recognition result corresponding to the facial image and a first score corresponding to the first recognition result based on each first distance set. After determining the at least one target eigenvector, the server may further calculate a distance between each target eigenvector and each eigenvector corresponding to each facial identifier to obtain a second distance set corresponding to each target eigenvector, and then determine a second recognition result corresponding to the facial image and a second score corresponding to the second recognition result based on each second distance set. After the first recognition result, the first score corresponding to the first recognition result, the second recognition result, and the second score corresponding to the second recognition result are determined, a facial recognition result corresponding to the facial image and a score corresponding to the facial recognition result may be determined. In this way, the facial recognition result corresponding to the facial image may be determined by merging the first recognition result and the second recognition result without training a classifier in advance. Therefore, retraining of the classifier may be avoided when a new facial identifier is added, so that efficiency of facial recognition may be improved.

When the facial recognition apparatus provided in the foregoing embodiment performs facial recognition, only division of the foregoing function modules is used as an example for description. In a practical application, the functions may be allocated to and completed by different function modules according to requirements. That is, an internal structure of the server is divided into different function modules, to complete all or some of the functions described above. In some embodiments, the facial recognition apparatus and the facial recognition method provided in the foregoing embodiments belong to the same conception. For the specific implementation process of the facial recognition apparatus, reference may be made to the method embodiments, and details are not described herein again.

Figure 6:
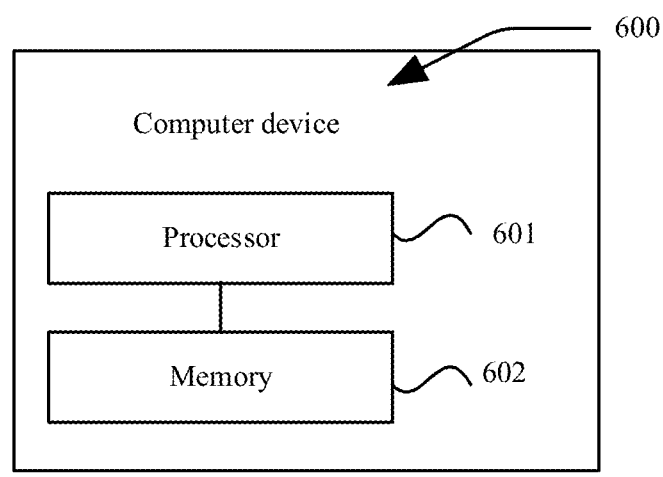
FIG. 6 is a schematic structural diagram of a server according to an embodiment of this application.

FIG. 6 is a schematic structural diagram of a computing device according to an embodiment of this application. The computing device 600 may vary greatly with different configurations or performance, and may include one or more processors (for example, central processing units (CPUs)) 601 and one or more memories 602. The memory 602 stores at least one instruction, and the at least one instruction is loaded and executed by the processor 601 to implement the foregoing facial recognition method.

In an exemplary embodiment, a non-transitory computer-readable storage medium is further provided, the storage medium storing at least one instruction, at least one program, a code set, or an instruction set, and the at least one instruction, the at least one program, the code set, or the instruction set being loaded and executed by a processor to implement the foregoing facial recognition method.

In the embodiments of this application, after obtaining a to-be-recognized facial image, a server may extract at least one target eigenvector corresponding to the facial image, and then calculate a distance between each target eigenvector and a mean vector corresponding to each facial identifier to obtain a first distance set corresponding to each target eigenvector, and determine a first recognition result corresponding to the facial image and a first score corresponding to the first recognition result based on each first distance set. After determining the at least one target eigenvector, the server may further calculate a distance between each target eigenvector and each eigenvector corresponding to each facial identifier to obtain a second distance set corresponding to each target eigenvector, and then determine a second recognition result corresponding to the facial image and a second score corresponding to the second recognition result based on each second distance set. After the first recognition result, the first score corresponding to the first recognition result, the second recognition result, and the second score corresponding to the second recognition result are determined, a facial recognition result corresponding to the facial image and a score corresponding to the facial recognition result may be determined. In this way, the facial recognition result corresponding to the facial image may be determined by merging the first recognition result and the second recognition result without training a classifier in advance. Therefore, retraining of the classifier may be avoided when a new facial identifier is added, so that efficiency of facial recognition may be improved.

A person of ordinary skill in the art may understand that all or some of steps of the embodiments may be implemented by hardware or a program instructing related hardware. The program may be stored in a computer-readable storage medium. The storage medium may be a read-only memory (ROM), a magnetic disk, an optical disc, or the like.

To sum up, the scope of the claims is not to be limited to the implementations in the examples described above, and the specification is to be considered as an entirety and explained in the broadest sense.

What is claimed is:

1. A facial recognition method, performed by a computing device having one or more processors and memory storing a plurality of programs to be executed by the one or more processors, and the method comprising:

obtaining a to-be-recognized facial image, and extracting at least one target eigenvector corresponding to the facial image;

calculating a distance between each target eigenvector and a mean vector corresponding to each facial identifier prestored in a database to obtain a first distance set corresponding to each target eigenvector, and determining a facial identifier corresponding to a minimum distance in each first distance set;

determining a most frequent facial identifier in facial identifiers corresponding to minimum distances in all the first distance sets as a first recognition result corresponding to the facial image and determining a first score corresponding to the first recognition result according to a minimum distance corresponding to the first recognition result in each first distance set;

calculating a distance between each target eigenvector and each eigenvector corresponding to each facial identifier prestored in the database to obtain a second distance set corresponding to each target eigenvector;

determining a facial identifier corresponding to a target distance satisfying a preset selection condition in each second distance set and determining a most frequent target facial identifier in facial identifiers corresponding to target distances in all the second distance sets as a second recognition result corresponding to the facial image; and determining a second score corresponding to the second recognition result according to a minimum distance corresponding to the second recognition result in each second distance set; and determining a facial recognition result corresponding to the facial image as one of the first recognition result and the second recognition result and a score corresponding to the facial recognition result by comparing the first recognition result with the second recognition result and comparing the first score corresponding to the first recognition result with the second score corresponding to the second recognition result.

2. The method according to claim 1, wherein the determining a facial recognition result corresponding to the facial image as one of the first recognition result and the second recognition result and a score corresponding to the facial recognition result by comparing the first recognition result with the second recognition result and comparing the first score corresponding to the first recognition result with the second score corresponding to the second recognition result comprises:

choosing one of the first recognition result and the second recognition result as the facial recognition result corresponding to the facial image and choosing a higher score of the first score and the second score as the score corresponding to the facial recognition result in a case that the first recognition result is the same as the second recognition result.

3. The method according to claim 1, wherein the determining a facial recognition result corresponding to the facial image as one of the first recognition result and the second recognition result and a score corresponding to the facial recognition result by comparing the first recognition result with the second recognition result and comparing the first score corresponding to the first recognition result with the second score corresponding to the second recognition result comprises:

choosing the second recognition result as the facial recognition result corresponding to the facial image and choosing the second score as the score corresponding to the facial recognition result in a case that the first recognition result is different from the second recognition result and the second score is greater than the first score by a first preset threshold.

4. The method according to claim 1, wherein the determining a facial recognition result corresponding to the facial image as one of the first recognition result and the second recognition result and a score corresponding to the facial recognition result by comparing the first recognition result with the second recognition result and comparing the first score corresponding to the first recognition result with the second score corresponding to the second recognition result comprises:

choosing the first recognition result as the facial recognition result corresponding to the facial image and choosing the first score as the score corresponding to the facial recognition result in a case that the first recognition result is different from the second recognition result and the first score is greater than the second score by a second preset threshold.

5. The method according to claim 1, wherein the determining a facial recognition result corresponding to the facial image as one of the first recognition result and the second recognition result and a score corresponding to the facial recognition result by comparing the first recognition result with the second recognition result and comparing the first score corresponding to the first recognition result with the second score corresponding to the second recognition result comprises:

choosing the first recognition result as the facial recognition result corresponding to the facial image and choosing a lower score of the first score and the second score as the score corresponding to the facial recognition result in a case that the first recognition result is different from the second recognition result, an absolute difference between the second score and the first score is less than a less of a first preset threshold and a second preset threshold.

6. The method according to claim 1, wherein the determining a facial recognition result corresponding to the facial image as one of the first recognition result and the second recognition result and a score corresponding to the facial recognition result by comparing the first recognition result with the second recognition result and comparing the first score corresponding to the first recognition result with the second score corresponding to the second recognition result comprises:

inputting the first recognition result, the first score corresponding to the first recognition result, the second recognition result, and the second score corresponding to the second recognition result into a pre-trained facial recognition model, to obtain the facial recognition result corresponding to the facial image and the score corresponding to the facial recognition result.

7. The method according to claim 6, further comprising:
calculating a distance between an eigenvector corresponding to each training facial image and the mean vector corresponding to each facial identifier prestored in the database to obtain a first distance set, determining a facial identifier corresponding to a minimum distance in the first distance set as a first recognition result corresponding to each training facial image, and determining a first score corresponding to the first recognition result according to a minimum distance corresponding to the first recognition result in the first distance set;

calculating a distance between the eigenvector corresponding to each training facial image and each eigenvector corresponding to each facial identifier prestored in the database to obtain a second distance set, and determining a facial identifier corresponding to a target distance satisfying the preset selection condition in the second distance set; and determining a most frequent target facial identifier in facial identifiers corresponding to all target distances as a second recognition result corresponding to each training facial image, and determining a second score corresponding to the second recognition result according to a minimum distance corresponding to the second recognition result in the second distance set;

inputting the first recognition result, the first score, the second recognition result, and the second score corresponding to each training facial image into a facial recognition model to obtain a facial recognition result and a score corresponding to each training facial image; and adjusting a model parameter of the facial recognition model according to the obtained facial recognition result and score corresponding to each training facial image and a preset facial recognition result and score corresponding to each training facial image to obtain the trained facial recognition model.

8. A server, comprising a processor and a memory, the memory storing at least one instruction, at least one program, a code set, or an instruction set, the at least one instruction, the at least one program, the code set, or the instruction set being loaded and executed by the processor to implement a facial recognition method by performing a plurality of operations including:

obtaining a to-be-recognized facial image, and extracting at least one target eigenvector corresponding to the facial image;

calculating a distance between each target eigenvector and a mean vector corresponding to each facial identifier prestored in a database to obtain a first distance set corresponding to each target eigenvector, and determining a facial identifier corresponding to a minimum distance in each first distance set;

determining a most frequent facial identifier in facial identifiers corresponding to minimum distances in all the first distance sets as a first recognition result corresponding to the facial image and determining a first score corresponding to the first recognition result according to a minimum distance corresponding to the first recognition result in each first distance set;

calculating a distance between each target eigenvector and each eigenvector corresponding to each facial identifier prestored in the database to obtain a second distance set corresponding to each target eigenvector;

determining a facial identifier corresponding to a target distance satisfying a preset selection condition in each second distance set and determining a most frequent target facial identifier in facial identifiers corresponding to target distances in all the second distance sets as a second recognition result corresponding to the facial image; and determining a second score corresponding to the second recognition result according to a minimum distance corresponding to the second recognition result in each second distance set; and determining a facial recognition result corresponding to the facial image as one of the first recognition result and the second recognition result and a score corresponding to the facial recognition result by comparing the first recognition result with the second recognition result and comparing the first score corresponding to the first recognition result with the second score corresponding to the second recognition result.

9. The server according to claim 8, wherein the determining a facial recognition result corresponding to the facial image as one of the first recognition result and the second recognition result and a score corresponding to the facial recognition result by comparing the first recognition result with the second recognition result and comparing the first score corresponding to the first recognition result with the second score corresponding to the second recognition result comprises:

choosing one of the first recognition result and the second recognition result as the facial recognition result corresponding to the facial image and choosing a higher score of the first score and the second score as the score corresponding to the facial recognition result in a case that the first recognition result is the same as the second recognition result.

10. The server according to claim 8, wherein the determining a facial recognition result corresponding to the facial image as one of the first recognition result and the second recognition result and a score corresponding to the facial recognition result by comparing the first recognition result with the second recognition result and comparing the first score corresponding to the first recognition result with the second score corresponding to the second recognition result comprises:

choosing the second recognition result as the facial recognition result corresponding to the facial image and choosing the second score as the score corresponding to the facial recognition result in a case that the first recognition result is different from the second recognition result and the second score is greater than the first score by a first preset threshold.

11. The server according to claim 8, wherein the determining a facial recognition result corresponding to the facial image as one of the first recognition result and the second recognition result and a score corresponding to the facial recognition result by comparing the first recognition result with the second recognition result and comparing the first score corresponding to the first recognition result with the second score corresponding to the second recognition result comprises:

choosing the first recognition result as the facial recognition result corresponding to the facial image and choosing the first score as the score corresponding to the facial recognition result in a case that the first recognition result is different from the second recognition result and the first score is greater than the second score by a second preset threshold.

12. The server according to claim 8, wherein the determining a facial recognition result corresponding to the facial image as one of the first recognition result and the second recognition result and a score corresponding to the facial recognition result by comparing the first recognition result with the second recognition result and comparing the first score corresponding to the first recognition result with the second score corresponding to the second recognition result comprises:

choosing the first recognition result as the facial recognition result corresponding to the facial image and choosing a lower score of the first score and the second score as the score corresponding to the facial recognition result in a case that the first recognition result is different from the second recognition result, an absolute difference between the second score and the first score is less than a less of a first preset threshold and a second preset threshold.

13. The server according to claim 8, wherein the determining a facial recognition result corresponding to the facial image as one of the first recognition result and the second recognition result and a score corresponding to the facial recognition result by comparing the first recognition result with the second recognition result and comparing the first score corresponding to the first recognition result with the second score corresponding to the second recognition result comprises:

inputting the first recognition result, the first score corresponding to the first recognition result, the second recognition result, and the second score corresponding to the second recognition result into a pre-trained facial recognition model, to obtain the facial recognition result corresponding to the facial image and the score corresponding to the facial recognition result.

14. The server according to claim 13, wherein the plurality of operations further comprise:

calculating a distance between an eigenvector corresponding to each training facial image and the mean vector corresponding to each facial identifier prestored in the database to obtain a first distance set, determining a facial identifier corresponding to a minimum distance in the first distance set as a first recognition result corresponding to each training facial image, and determining a first score corresponding to the first recognition result according to a minimum distance corresponding to the first recognition result in the first distance set;

calculating a distance between the eigenvector corresponding to each training facial image and each eigenvector corresponding to each facial identifier prestored in the database to obtain a second distance set, and determining a facial identifier corresponding to a target distance satisfying the preset selection condition in the second distance set; and determining a most frequent target facial identifier in facial identifiers corresponding to all target distances as a second recognition result corresponding to each training facial image, and determining a second score corresponding to the second recognition result according to a minimum distance corresponding to the second recognition result in the second distance set;

inputting the first recognition result, the first score, the second recognition result, and the second score corresponding to each training facial image into a facial recognition model to obtain a facial recognition result and a score corresponding to each training facial image; and adjusting a model parameter of the facial recognition model according to the obtained facial recognition result and score corresponding to each training facial image and a preset facial recognition result and score corresponding to each training facial image to obtain the trained facial recognition model.

15. A non-transitory computer-readable storage medium, storing at least one instruction, at least one program, a code set, or an instruction set, the at least one instruction, the at least one program, the code set, or the instruction set being loaded and executed by a processor to implement a facial recognition method by performing a plurality of operations including:
  obtaining a to-be-recognized facial image, and extracting at least one target eigenvector corresponding to the facial image;
  calculating a distance between each target eigenvector and a mean vector corresponding to each facial identifier prestored in a database to obtain a first distance set corresponding to each target eigenvector, and determining a facial identifier corresponding to a minimum distance in each first distance set;
  determining a most frequent facial identifier in facial identifiers corresponding to minimum distances in all the first distance sets as a first recognition result corresponding to the facial image and determining a first score corresponding to the first recognition result according to a minimum distance corresponding to the first recognition result in each first distance set;
  calculating a distance between each target eigenvector and each eigenvector corresponding to each facial identifier prestored in the database to obtain a second distance set corresponding to each target eigenvector;
  determining a facial identifier corresponding to a target distance satisfying a preset selection condition in each second distance set and determining a most frequent target facial identifier in facial identifiers corresponding to target distances in all the second distance sets as a second recognition result corresponding to the facial image; and determining a second score corresponding to the second recognition result according to a minimum distance corresponding to the second recognition result in each second distance set; and
  determining a facial recognition result corresponding to the facial image as one of the first recognition result and the second recognition result and a score corresponding to the facial recognition result by comparing the first recognition result with the second recognition result and comparing the first score corresponding to the first recognition result with the second score corresponding to the second recognition result.

16. The non-transitory computer-readable storage medium according to claim 15, wherein the determining a facial recognition result corresponding to the facial image as one of the first recognition result and the second recognition result and a score corresponding to the facial recognition result by comparing the first recognition result with the second recognition result and comparing the first score corresponding to the first recognition result with the second score corresponding to the second recognition result comprises:
  choosing one of the first recognition result and the second recognition result as the facial recognition result corresponding to the facial image and choosing a higher score of the first score and the second score as the score corresponding to the facial recognition result in a case that the first recognition result is the same as the second recognition result.

17. The non-transitory computer-readable storage medium according to claim 15, wherein the determining a facial recognition result corresponding to the facial image as one of the first recognition result and the second recognition result and a score corresponding to the facial recognition result by comparing the first recognition result with the second recognition result and comparing the first score corresponding to the first recognition result with the second score corresponding to the second recognition result comprises:
  choosing the second recognition result as the facial recognition result corresponding to the facial image and choosing the second score as the score corresponding to the facial recognition result in a case that the first recognition result is different from the second recognition result and the second score is greater than the first score by a first preset threshold.

18. The non-transitory computer-readable storage medium according to claim 15, wherein the determining a facial recognition result corresponding to the facial image as one of the first recognition result and the second recognition result and a score corresponding to the facial recognition result by comparing the first recognition result with the second recognition result and comparing the first score corresponding to the first recognition result with the second score corresponding to the second recognition result comprises:
  choosing the first recognition result as the facial recognition result corresponding to the facial image and choosing the first score as the score corresponding to the facial recognition result in a case that the first recognition result is different from the second recognition result and the first score is greater than the second score by a second preset threshold.

19. The non-transitory computer-readable storage medium according to claim 15, wherein the determining a facial recognition result corresponding to the facial image as one of the first recognition result and the second recognition result and a score corresponding to the facial recognition result by comparing the first recognition result with the second recognition result and comparing the first score corresponding to the first recognition result with the second score corresponding to the second recognition result comprises:
  choosing the first recognition result as the facial recognition result corresponding to the facial image and choosing a lower score of the first score and the second score as the score corresponding to the facial recognition result in a case that the first recognition result is different from the second recognition result, an absolute difference between the second score and the first score is less than a less of a first preset threshold and a second preset threshold.

20. The non-transitory computer-readable storage medium according to claim 15, wherein the determining a facial recognition result corresponding to the facial image as one of the first recognition result and the second recognition result and a score corresponding to the facial recognition result by comparing the first recognition result with the second recognition result and comparing the first score corresponding to the first recognition result with the second score corresponding to the second recognition result comprises:
  inputting the first recognition result, the first score corresponding to the first recognition result, the second recognition result, and the second score corresponding to the second recognition result into a pre-trained facial recognition model, to obtain the facial recognition result corresponding to the facial image and the score corresponding to the facial recognition result.

* * * * *